(12) United States Patent
Hopkins, Jr.

(10) Patent No.: US 9,232,774 B2
(45) Date of Patent: Jan. 12, 2016

(54) POLYMER REINFORCED WOODEN HIVES

(75) Inventor: Thomas G. Hopkins, Jr., Sandy, UT (US)

(73) Assignee: Thomas G. Hopkins, Jr., Sandy, UT (US)

( * ) Notice: Subject to any disclaimer, the term of this patent is extended or adjusted under 35 U.S.C. 154(b) by 164 days.

(21) Appl. No.: 13/481,681

(22) Filed: May 25, 2012

(65) Prior Publication Data

US 2013/0316614 A1    Nov. 28, 2013

(51) Int. Cl.
*A01K 47/06*      (2006.01)

(52) U.S. Cl.
CPC ...................................... *A01K 47/06* (2013.01)

(58) Field of Classification Search
CPC ........ A01K 47/00; A01K 47/06; A01K 51/00
USPC ........................... 449/3, 13, 15, 26, 29, 30, 32
IPC .................................. A01K 47/00, 47/06, 51/00
See application file for complete search history.

(56) References Cited

U.S. PATENT DOCUMENTS

| | | | | |
|---|---|---|---|---|
| 1,816,631 | A | * | 7/1931 | Brown .............................. 449/13 |
| 3,439,364 | A | | 4/1969 | Paoletti |
| 3,704,471 | A | * | 12/1972 | Bielby ............................. 449/13 |
| 4,199,832 | A | | 4/1980 | Glasscock et al. |
| 4,402,099 | A | * | 9/1983 | Platt, Jr. .......................... 449/30 |
| 4,524,476 | A | | 6/1985 | Adams, IV |
| 5,509,846 | A | | 4/1996 | Kueneman |
| 5,534,295 | A | * | 7/1996 | Schlichter ................ B05D 1/02 427/284 |
| 5,741,170 | A | * | 4/1998 | Orletsky et al. .................... 449/7 |
| 6,579,147 | B1 | * | 6/2003 | DeYoung ......................... 449/15 |
| 2007/0157504 | A1 | * | 7/2007 | Nelson ................................. 43/3 |
| 2007/0224913 | A1 | * | 9/2007 | Brisson et al. ..................... 449/3 |
| 2008/0026674 | A1 | * | 1/2008 | Cook ................................ 449/2 |
| 2009/0104288 | A1 | * | 4/2009 | Probasco ....................... 424/725 |
| 2010/0297910 | A1 | | 11/2010 | Baker |
| 2012/0052109 | A1 | * | 3/2012 | Watkins ................. A01K 51/00 424/443 |

FOREIGN PATENT DOCUMENTS

CA            2474989 A1 * 1/2006

OTHER PUBLICATIONS

PCT/US2013/042708; filed May 24, 2013; Beehive State LLC; international search report dated Sep. 6, 2013.

* cited by examiner

*Primary Examiner* — Lisa Tsang
(74) *Attorney, Agent, or Firm* — Thorpe North & Western LLP

(57) ABSTRACT

A polymer reinforced wooden hive can comprise a wooden hive box built with joints and having an exterior surface, and interior surface, and at least one rim for receiving a hive top or a hive bottom. A continuous polymeric coating is applied to the exterior surface and the rim, but not to the interior surface. The continuous polymeric coating can provide mechanical reinforcement to the joints, strengthening the wooden hive box. Hive tops and hive bottoms can also be included as part of the polymer reinforced wooden hives, and can likewise be coated with a continuous polymeric coating.

58 Claims, 3 Drawing Sheets

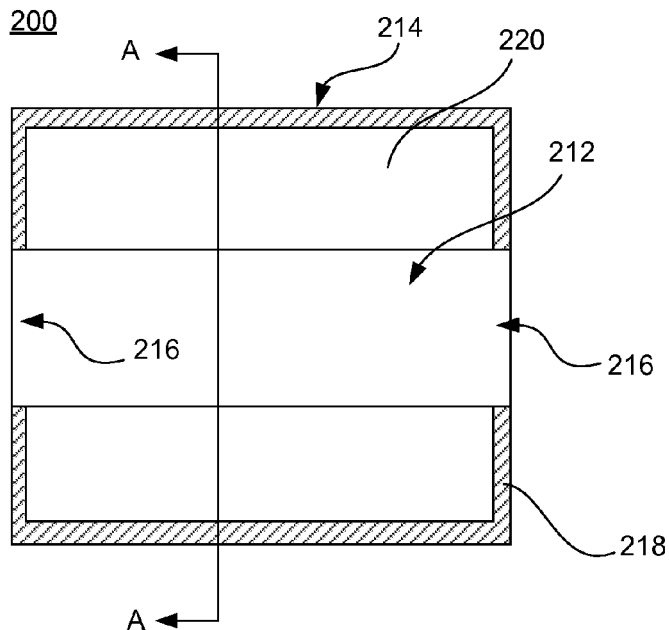 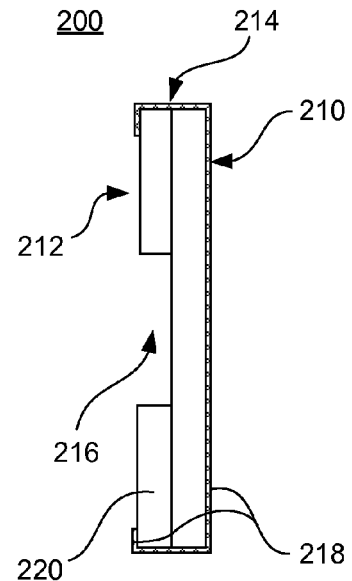
FIG. 7   FIG. 8
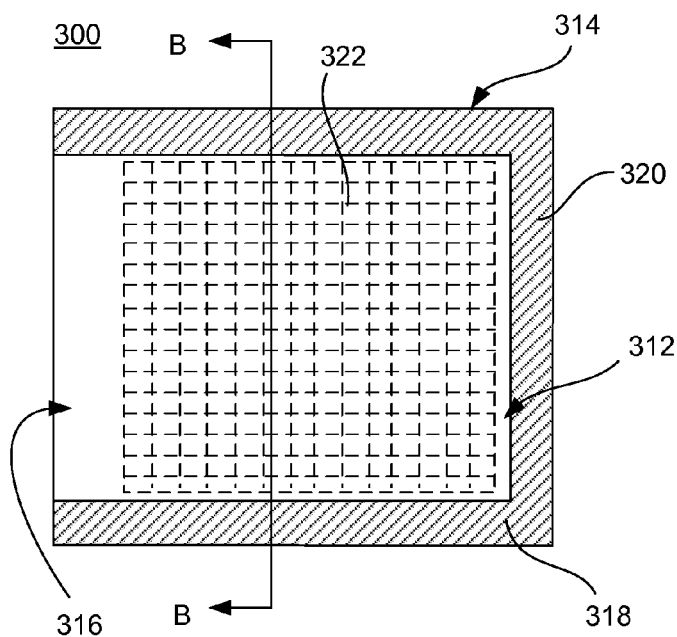 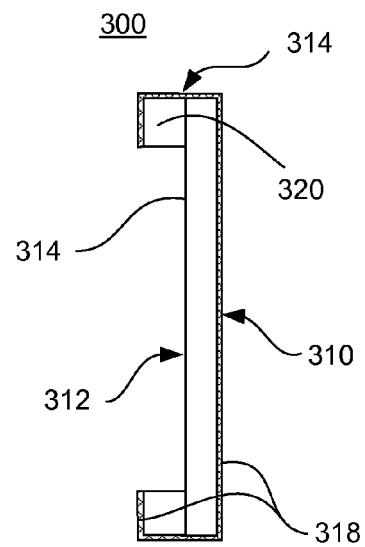
FIG. 9   FIG. 10

POLYMER REINFORCED WOODEN HIVES

BACKGROUND

The keeping of bees has become increasingly popular over the last several years. With both hobby and commercial keeping, maintaining long lasting and effective equipment such as bee boxes, box tops, box bottoms, and the like, can be problematic. Many bee keepers claim that bees prefer, and thus thrive in wooden hives, compared to hives made from other materials, but wood does not typically do well when exposed to the elements. Paints and varnishes can be used to ameliorate this issue to some degree, but repainting becomes an extra duty that detracts from actual bee keeping duties. Alternatively, there are bee box designs prepared entirely from synthetic polymers. However, such materials do not seem to be as desirable to many bee colonies.

There are many different types of hives that are known, but there are two that are the most popular in modern use. By far, the most common modern hive is the Langstroth hive. The Langstroth hive comprises standardized sizes of rectangular boxes with interchangeable internal frames that are hung in parallel. These boxes can be stacked to expand the usable space for the bees. Box tops and bottoms can also be used, and typically have openings for bee access. Another type of modern hive that is still relatively common is the top-bar hive. This type of hive includes a top-bar to support the comb. Both of these types of hives are convenient because they both provide a means of inspect the hive for diseases or parasites. Movable and interchangeable parts also permit the beekeeper to more easily split the hive to make new colonies, as well as harvest the hive without significantly damaging the equipment, though there are limits to this.

Even with the convenience and effectiveness of these modern hives, it would be desirable to provide a hive that is both desirable to the bees, as well as provide bee boxes, tops, and bottoms that are long lasting, strong, and easily reusable while, minimizing damage to the equipment during normal usage.

SUMMARY

A polymer reinforced wooden hive can comprise a wooden hive box built with joints and having an exterior surface, and interior surface, and at least one rim. The hive can further comprise a continuous polymeric coating applied to the exterior surface and the rim, but substantially not to the interior surface. The continuous polymeric coating can provide mechanical reinforcement to the joints, strengthening the wooden hive box.

In another example, a method of reinforcing a wooden hive box can comprise obtaining a wooden hive box built with joints and having an exterior surface, and interior surface, and at least one rim. The method can further comprise the step of coating a polymer on the exterior surface and the rim, including exterior joints thereof, at a thickness sufficient to form a continuous polymeric coating that provides mechanical reinforcement to the joints. Furthermore, the interior surface can remain at least substantially uncoated.

In a more specific example, a polymer reinforced wooden hive can comprise a wooden hive box including an exterior surface, an interior surface, an upper rim, and a lower rim; a wooden hive top including an upper surface, an outer rim, and a lower surface; and a wooden hive bottom including a lower surface, an outer rim, and an upper surface. A polymer can be applied as a continuous polymeric coating to each of these structures, e.g., the wooden hive box on the exterior surface, the upper rim, and the lower rim, but substantially not to the interior surface; the wooden hive top on the upper surface and the outer rim; and the wooden hive bottom on the lower surface and the outer rim.

BRIEF DESCRIPTION OF THE DRAWINGS

FIG. 7 is a plan view of a lower surface of a wooden hive top with a continuous polymeric coating applied to an outer periphery of the lower surface;

FIG. 8 is a cross-sectional view of the wooden hive top of FIG. 7, taken along section A-A;

FIG. 9 is a plan view of an upper surface of a wooden hive bottom with a continuous polymeric coating applied to an outer periphery of the upper surface; and FIG. 10 is a cross-sectional view of the hive bottom of FIG. 9, taken along section B-B.

DETAILED DESCRIPTION

Figure 1:
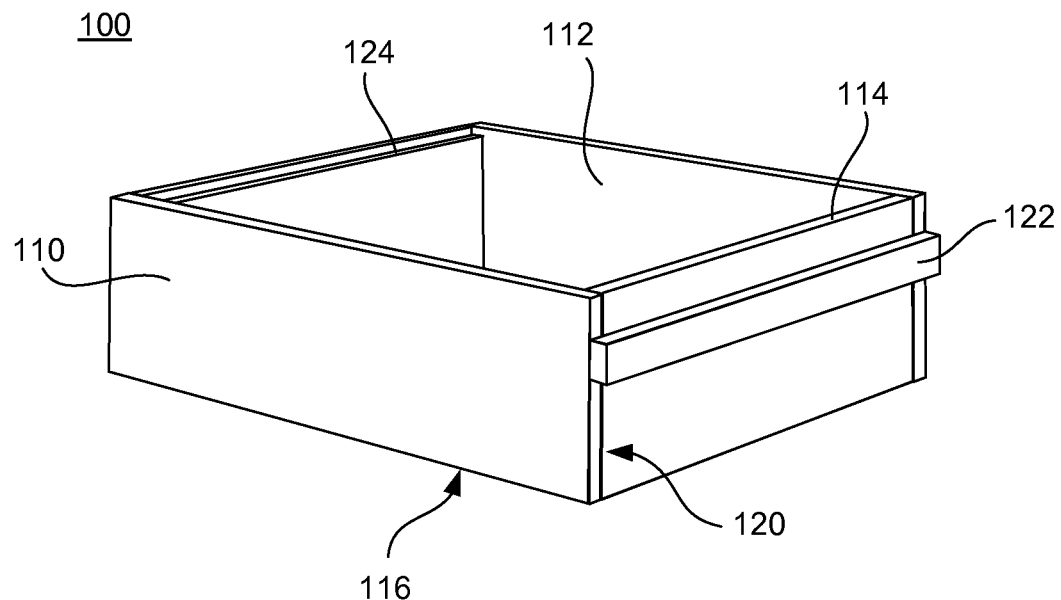
FIG. 1 is a perspective view of a wooden hive box.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

The following terminology will be used in accordance with the definitions set forth below.

As used herein, the singular forms "a," and, "the" include plural referents unless the context clearly dictates otherwise.

The term "hive box" refers to the main portion of the artificial or man-made hives of the present disclosure. The hive box can be open on the top and/or bottom, or can include an integrated hive top or hive bottom. However, most typically, the hive top and hive bottom are separate structures that are modularly assembled. Thus, the term "hive box" should be interpreted broadly to include any hive box, including Langstroth hive arrangements, top-bar hive arrangements, or the like, unless the context dictates otherwise. Furthermore, the term "box" should not be interpreted to include only cubical-like structures, as other shapes are also possible (as is the case with many top-bar hives that are V-shaped or have other more creative configurations).

Likewise, "hive top" refers to a hive box cover that can be used to cover the top of a hive box. A hive top may include an opening when placed on a hive box to allow for bee access and/or ventilation to the hive. Typically, the access provided by this opening should be limited so that it can be defended by the bees. That being said, the access can be anywhere on the hive, but in one example, is found between a gap provided by the hive top and a rim of the hive box. The hive top is typically assembled with the hive box by the bee keeper, and thus is part of a modular system, though this is not required.

"Hive bottom" refers to a structure that supports the hive box and typically includes some ventilation access to the hive box, e.g., a screen or an opening created by a gap between the hive bottom and the hive box. The hive bottom is typically assembled with the hive box by the bee keeper, and thus is part of a modular system, though this is not required.

The term "wooden" when referring to the hive box, hive top, or hive bottom means that the primary construction of these structures is of wood. However, it is understood that the term "wooden" merely describes the base construction and does not preclude the presence of other coatings or structures applied or attached thereto. For example, a metal or plastic handle could be attached to a wooden hive box and it would still be considered to be a "wooden hive box." Likewise, a non-wooden screen can be included on the hive bottom, and it would still be considered a wooden hive bottom.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a description stating that a coating is not substantially present on a surface does not mean that there can be absolutely no coating on that surface. It does, however, mean that the surface may be completely free of the coating, or the surface may include only a minor amount of the coating, e.g., attributed to overspray, dripping, or other small amounts of material that would not negatively impact the purpose of keeping the surface free of that particular coating composition.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In some examples, specific sizes, shapes, dimensions, etc. may be provided for illustrative purposes. However, such examples are intended to be non-limiting and a variety of other sizes, shapes, dimensions, etc. may be implemented to accommodate specific applications. For example, it is important to note that many exemplary dimensions will be provided herein regarding the size and shape of the bee boxes, tops, bottoms, etc. These dimensions are provided to establish typical sized bee boxes, though sizes outside of these ranges are also applicable. These specific dimensions are not to be construed as critical to the invention, and in fact, may be modified liberally for other specific configurations.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth herein, it is noted in the present disclosure that when describing the hives and relate methods, individual or separate descriptions are considered applicable to one another, whether or not explicitly discussed in the context of a particular example or embodiment. For example, in discussing a hive box per se, system and/or method embodiments are also included in such discussions, and vice versa.

In accordance with this, a polymer reinforced wooden hive can comprise a wooden hive box built with joints and having an exterior surface, and interior surface, and at least one rim, such as for receiving a hive top or a hive bottom in one embodiment. The hive can further comprise a continuous polymeric coating applied to the exterior surface and the rim, but substantially not to the interior surface. The continuous polymeric coating can provide mechanical reinforcement to the joints, strengthening the wooden hive box.

In another example, a method of reinforcing a wooden hive box can comprise obtaining a wooden hive box built with joints and having an exterior surface, and interior surface, and at least one rim, such as for receiving a hive top or a hive bottom in one embodiment. The method can further comprise the step of coating a polymer on the exterior surface and the rim, including exterior joints thereof, at a thickness sufficient to form a continuous polymeric coating that provides mechanical reinforcement to the joints. Furthermore, the interior surface can remain at least substantially uncoated.

In accordance with examples of the present disclosure, a wooden hive top including an upper surface, an outer rim, and a lower surface can also be part of the hive. In these examples, the continuous polymeric coating can be applied to at least the upper surface and the outer rim. The rim of the wooden hive box is can be an upper rim, and only an outer periphery (at least in part) of the lower surface may be coated with the continuous polymeric coating so that when the hive top is in placed on the hive box, the polymeric coating can be present on both the upper rim of the hive box and the outer periphery on the lower surface of the hive top where the outer periphery contacts the upper rim.

In another example, a wooden hive bottom can also be included having a lower surface, an outer rim, and an upper surface. In this embodiment, at least the lower surface and the outer rim are coated with the continuous polymeric coating. The rim of the wooden hive box can be a lower rim, and only an outer periphery (at least in part) of the upper surface may be coated with the continuous polymeric coating so that when the hive box is in place on the hive bottom, the polymeric coating can be present on both the lower rim of the hive box and the outer periphery on the upper surface of the hive bottom where the outer periphery contacts the lower rim.

Of course, both a hive bottom and hive top can be used at the same time as well, as set forth in this more specific example. Thus, polymer reinforced wooden hive can comprise a wooden hive box including an exterior surface, an interior surface, an upper rim, and a lower rim; a wooden hive top including an upper surface, an outer rim, and a lower surface; and a wooden hive bottom including a lower surface, an outer rim, and an upper surface. A polymer can be applied as a continuous polymeric coating to each of i) the wooden hive box on the exterior surface, the upper rim, and the lower rim, but substantially not to the interior surface; ii) the wooden hive top on the upper surface and the outer rim; and iii) the wooden hive bottom on the lower surface and the outer rim. In this example, the wooden hive top may also coated on the lower surface only along a periphery thereof, and/or the wooden hive bottom is also coated on the upper surface only along a periphery thereof.

In either case, there are advantages of having the continuous polymeric coating applied not only to the exterior surface of the hive box (and upper surface of the hive top and/or lower surface of the hive bottom), but also to the various rims of the hive box and/or periphery of the hive top and bottom that contacts the respective hive box rims. Specifically, in addition to forming honeycomb and generating honey, bees also tend to also seal any small cracks with propolis. Propolis is a mixture of resinous material collected by the bees from various botanical sources, and is used to seal unwanted openings, e.g., approximately 6 mm or less. Propolis is generally very sticky above room temperature, and hard/brittle below room temperature. Thus, honeybees generate propolis and use it to seal the cracks between the hive boxes (one stacked on another) or to seal the cracks between the hive box and the hive top and/or bottom. Thus, a bee keeper generally carries a hive tool to separate the boxes or the hive top or bottom from the hive box. As propolis is quite sticky, much like a glue, it is sometimes difficult to separate the structures sealed together with propolis without damaging or disturbing the hive. When the rims of the hive boxes and inside periphery of the hive top or bottom is coated with the continuous polymeric coating described herein, the structures are usually easier to separate from one another. Furthermore, the continuous polymeric coating also provides protection to the integrity of the wooden hive box, hive top and/or hive bottom when the structures are forced apart using a hive tool or other rigid tool. By preventing damage to the rim of the hive box, the box can be used and reused for more cycles than a typically wooden box, even if the wooden box is painted or has some other clear coating thereon that does not prevent significant damage to the wooden structure.

In another example, the wooden hive bottom can include a screen for allowing air flow into the wooden hive box. This is not required, but some ventilation other than the bee entrances and exits can beneficial to many hives. Another optional structure that can be present is handles. In one example, a pair of handles can be attached to the exterior surface so that the continuous polymeric coating transitions from the exterior surface of the hive box to the pair of handles, thus providing reinforcement to the attachment strength of the handles. Thus, the continuous polymeric coating can be essentially seamless between the exterior surface of the hive box onto the handles. Alternatively, notched handles can also be used that are recessed into the exterior surface of the hive boxes, and these notched handles can likewise be coated with the continuous polymeric coating as described herein.

In preparing the hive box, hive top, or hive bottom, typical carpentry techniques can be used, including cutting wood planks to size, and gluing and/or nailing the wood planks together at joints. Notched joints can also be used to enhance the strength of corners in one example. Again, the continuous polymeric coating can act to further strengthen these joints. Furthermore, regarding choice of wood, any wood that would be acceptable to a hive of bees can be used in accordance with examples of the present disclosure. However, in one specific example, cedar can be used.

Turning now to the polymeric coating compositions that can be used in accordance with examples of the present disclosure, specific examples of acceptable polymers include polyurethanes, polyurea, epoxies, acrylics, acrylates, polyesters, silicones, combinations and blends thereof, and the like. These compositions can be applied and cured in a variety of ways. Some compositions can be applied and UV cured, as exemplified by many products available from MasterBond, DuPont, Polymark, etc. Others compositions can be applied from a two part composition, such as by spraying using specialized sprayers that admix multiple parts together immediately prior to application to the surfaces of the hive boxes, hive tops, and hive bottoms. A suitable sprayer that can be used is available from Langeman Manufacturing Ltd., and is sold by the tradename GXPRO Spray System. These coatings can be applied at a relative thickness that not only protects the wood from the elements, but is thick enough to reinforce joints, handles, etc., as previously described. It has been found that the continuous polymeric coating can be applied at a thickness ranging from 0.5 mm to 10 mm, and in some examples from 1 mm to 5 mm or from 2 mm to 4 mm. Furthermore, when applying the continuous polymeric coating composition, the coating can be applied with a stipple. For example, by shooting the coating composition at an angle ranging from 5° to 25°, a stipple effect can be generated on the surface that provides extra grip to the exterior surface and handles of the hive box, as well as the hive tops and bottoms.

With more specific reference to the polyurethane and polyurea compositions that can be applied to form the continuous polymeric coating on the hive boxes, hive tops, and hive bottoms, the following is illustrative of the possible compositions that can be used. For example, two-component elastomeric polyurethanes, two-component elastomeric polyureas, and two-component polyurethane/polyurea hybrid or blend systems can be used to coat the hive boxes, hive tops, and hive bottoms in accordance with the present disclosure.

Polyurethanes, in particular, are prepared from reacting two parts together to form a reaction polymer. Polyurethanes, in particular, include a urethane linkage prepared from reacting an isocyanate group ($-N=C=O$) with a hydroxyl group. Typically, a polyol is used for the reaction, which is a compound with multiple hydroxyl groups, and the reaction occurs in the presence of a catalyst and optionally, other additives. This reaction forms the urethane linkage. Many modifications of polyurethanes can be prepared, depending on the isocyanate group-containing compound used and the polyol-containing compound used. For purposes of the present disclosure, any polyurethane formed that provides protection of the wood from the elements, use of tools, and joint reinforcement can be used. Polyureas, on the other hand, are often prepared as a reaction product of isocyanates with polyetheramines. Typically, reaction between a polyisocyanate component and a resin blend component made up of blends of amine-terminated polymer resins can be common. Any polyurea, no matter how formed, can likewise be used as described herein.

Suitable polyurethanes, polyureas, or blends of polyurethane/polyureas include compositions sold by Rhino Linings Corporation, such as TUFFGRIP® (Polyurethane/Polyurea blend), HARDLINE® (Polyurethane), SOLARMAX® (Polyurethane), and RHINO HYBRID® (Polyurea). There are also other commercial products that are acceptable for use, including other compositions from Rhino Linings Corporation, as well as coatings from Reflex and Guard It. Reflex RX700 is another acceptable polyurea composition for use in accordance with examples of the present disclosure.

Figure 2:
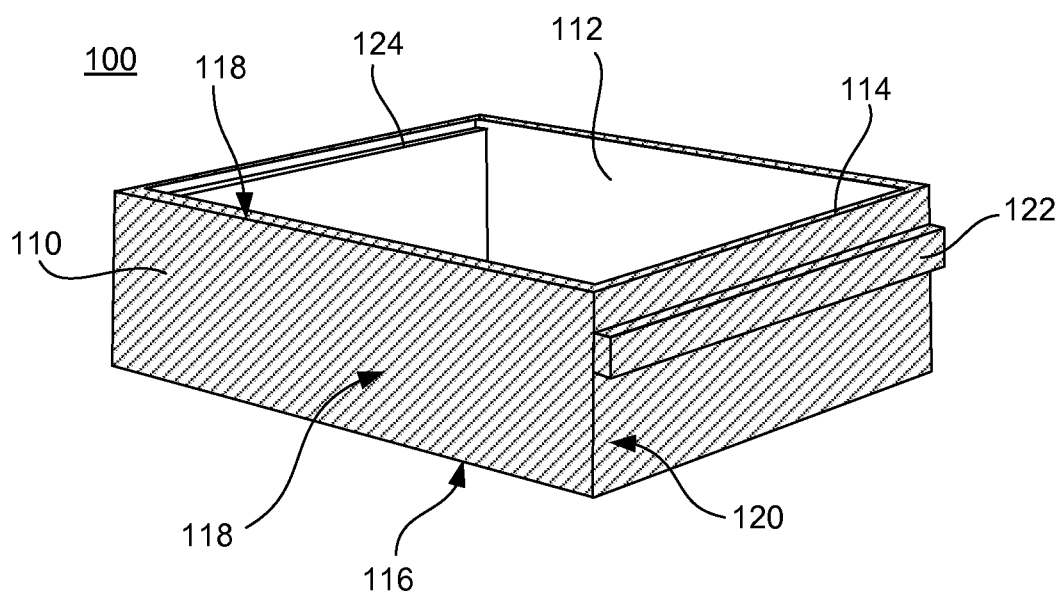
FIG. 2 is a perspective view of the wooden hive box of FIG. 1 with a continuous polymeric coating applied thereto.

Turning now to the FIGS., a specific example of one specific artificial, man-made beehive is shown and described in some detail. However, it is specifically noted that other hive arrangements are possible, or even likely, and this embodiment is provided merely to show one example of the polymer reinforced wooden hives of the present disclosure. Specifically, referring to FIGS. 1 and 2, a hive box 100 is shown having an exterior surface 110, and interior surface 112, and an upper rim 114, and a lower rim 116. The hive is assembled using various planks of wood which are nailed and/or glued together to form a plurality of joints 120. To the exterior surface is secured a plurality of handles 122 (one handle is not shown in this perspective view). Also, an interior shelf 124 is shown. FIG. 2 specifically shows a continuous polymeric coating 118 applied to the exterior surface and at least one of the upper rim and the lower rim (typically both). In this configuration, the continuous polymeric coating can provide significant reinforcement to the various joints where wooden planks are brought together, as well as to the security of the handles. Thus, the continuous and relative thick application of the polymeric coating provides both weather resistance to the wood and to joints that would be particularly susceptible water and ice damage, as well a structural rigidity because of the continuous thick film of polymer that bridges adjacent structures. It is noted that though protruding handles are shown in this embodiment, the hive boxes could likewise have recessed handles, which would also benefit from the continuous polymeric coatings of the present disclosure.

Figure 3:
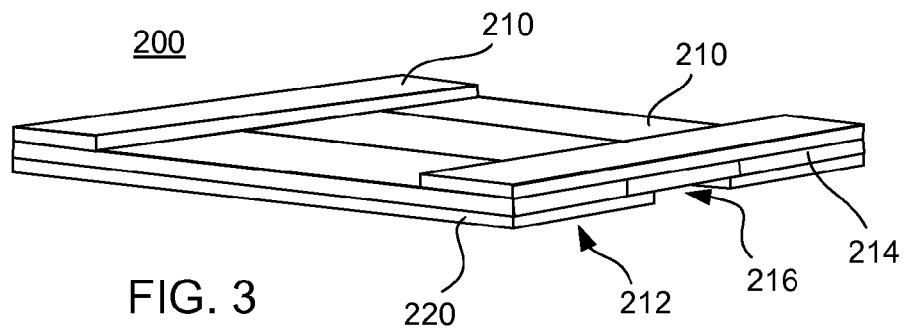
FIG. 3 is a perspective view of a wooden hive top.
Figure 4:
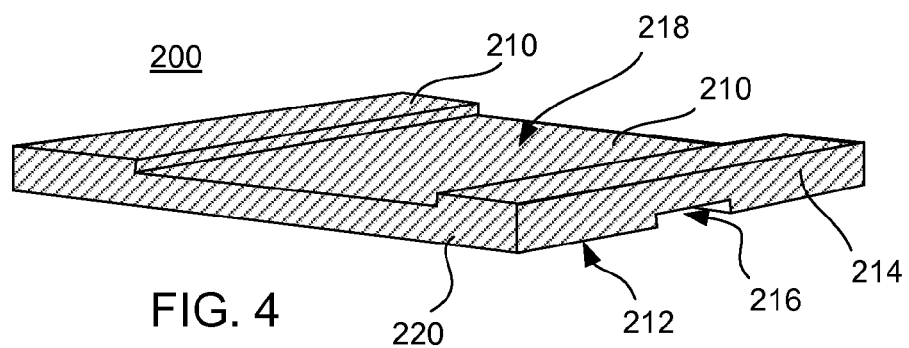
FIG. 4 is a perspective view of the wooden hive top of FIG. 3 with a continuous polymeric coating applied thereto.

Turning FIGS. 3 and 4, a hive top 200 is shown having an upper surface 210, a lower surface 212, and an outer rim 214. In this example, a pair of spacing boards 220 is secured to the lower surface (and redefines the lower surface to include the spacing boards in this example). These spacing boards are designed to rest on the upper rim of the hive box (shown if FIGS. 1 and 2). However, as shown, the spacing boards do not rest on the upper rim around the entire periphery of the lower surface, leaving an opening 216 to provide ventilation and/or access for bees to enter and exit the hive. Shown specifically in FIG. 4, a continuous polymeric coating 218 is applied to the upper surface and the outer rim including to edge surfaces of the spacing boards. Not shown in FIG. 4, but shown in further detail in FIGS. 7 and 8, is an optional further extension of the continuous polymeric coating that is also applied to portions of the lower surface on the spacing boards, as will be described in further detail hereinafter.

Figure 5:
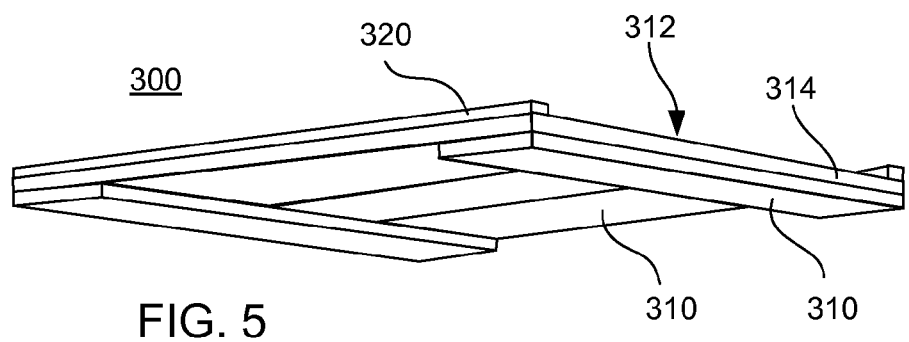
FIG. 5 is a perspective view of a wooden hive bottom.
Figure 6:
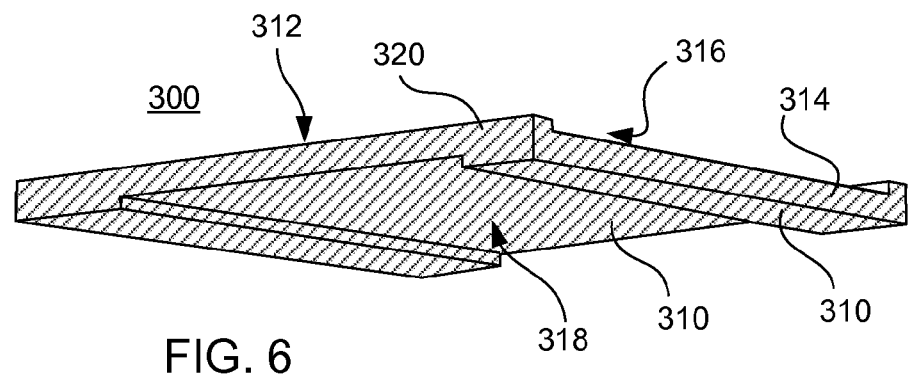
FIG. 6 is a perspective view of the wooden hive bottom of FIG. 5 with a continuous polymeric coating applied thereto.

FIGS. 5 and 6 show a hive bottom 300 having a lower surface 310, and upper surface 312, and an outer rim 314. The hive bottom in this example comprises three spacing boards 320 (positioned in a U-shape) that are essentially flush with the outer rim. The spacing boards act to support a lower rim of the hive box on three sides, leaving an opening 316 for bee access and/or ventilation. Shown specifically in FIG. 6 is a continuous polymeric coating 318 applied to the lower surface and the outer rim including edge surfaces of the spacing boards. Not shown in FIG. 6, but shown in further detail in FIGS. 9 and 10, is an optional further extension of the continuous polymeric coating also applied to portions of the upper surface on the spacing boards as will be described in further detail hereinafter.

FIGS. 7 and 8 depict a plan view of the lower surface of the hive top 200, and a cross-sectional view of the hive top taken along section A-A, respectively. In these views collectively, an upper surface 210 (shown only in FIG. 8), a lower surface 212, and an outer rim 214 are shown. An opening 216 is provided so that when the hive top rests on the rim of the hive box (not shown), ventilation and/or bee access is provided. Further detail regarding the spacing boards 220 is also shown, including their relative placement and how they partially define the opening. As can be seen in further detail in these FIGS., the continuous polymeric coating is not only present on the upper surface and the outer rim (including three edges of each of the spacing boards), but along a periphery of the lower surface that will contact the upper rim of the hive box. Thus, when the hive top is placed on the upper rim of the hive box (shown in FIG. 2), the continuous polymeric coating of the hive top rests on the continuous polymeric coating on the rim of the hive box, providing advantages described previously with respect to weather resistance, damage prevention, etc.

Turning now to FIGS. 9 and 10, a plan view of the upper surface of the hive bottom 300, and a cross-sectional view of the hive bottom taken along section B-B, are each shown respectively. In these views, a lower surface 310 (shown only in FIG. 10), an upper surface 312, and an outer rim 314 are shown. An opening 316 is provided so that when the hive box (not shown) rests on the rim of the hive bottom, ventilation and/or bee access is provided. Further detail regarding the spacing boards 320 is also shown, including their relative placement and how they partially define the opening. As can be seen in further detail in these FIGS., the continuous polymeric coating is not only present on the lower surface and the outer rim (including three edges of the spacing boards along the outer rim), but also along a periphery of the lower surface on a fourth side of the spacing boards. Thus, when the hive box is placed on the spacing boards of the hive bottom, the continuous polymeric coating of the lower rim of the hive box rests on the continuous polymeric coating on the spacing boards of the hive bottom, providing advantages described previously with respect to weather resistance, damage prevention, etc.

In one specific example as shown in FIG. 9 in phantom lines, a screen 322 can optionally be positioned in a generally center region of the hive bottom 300 for providing ventilation to the hive. Typically, the screen remains uncoated from both the upper surface and the lower surface. It is noted that the screen is not shown in FIG. 10, which depicts an embodiment that does not include the optional screen.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A polymer reinforced wooden hive, comprising:
   a wooden hive box built with joints and having an exterior surface, an interior surface, and at least one rim; and
   a continuous polymeric coating comprising polyurea applied to the exterior surface and the at least one rim, but substantially not to the interior surface, wherein the interior surface is a substantially uncoated wood surface, wherein the continuous polymeric coating is applied at a coating thickness to provide mechanical reinforcement to the joints, strengthening the wooden hive box, and wherein the continuous polymeric coating applied to the at least one rim protects against rim damage when a hive top or a hive bottom are forced apart from the wooden hive box using a hive tool.

2. The polymer reinforced wooden hive of claim 1, further comprising a wooden hive top including an upper surface, an outer rim, and a lower surface, and wherein at least the upper surface and the outer rim are coated with the continuous polymeric coating.

3. The polymer reinforced wooden hive of claim 2, wherein the at least one rim of the wooden hive box is an upper rim, and wherein only a portion of the lower surface is coated along an outer periphery so that when the wooden hive top is placed on the wooden hive box, the continuous polymeric coating is present on the wooden hive top and the wooden hive box where the outer periphery contacts the upper rim.

4. The polymer reinforced wooden hive of claim 1, further comprising a wooden hive bottom including a lower surface, an outer rim, and an upper surface, and wherein at least the lower surface and the outer rim are coated with the continuous polymeric coating.

5. The polymer reinforced wooden hive of claim 4, wherein the at least one rim of the wooden hive box is a lower rim, and wherein only a portion of an the upper surface is coated along an outer periphery so that when the wooden hive box is placed on the wooden hive bottom, the continuous polymeric coating is present on both the wooden hive bottom and the wooden hive box where the outer periphery contacts the lower rim.

6. The polymer reinforced wooden hive of claim 5, wherein the wooden hive bottom includes a screen for allowing air flow into the wooden hive box, and the screen is substantially uncoated from both the upper surface and the lower surface.

7. The polymer reinforced wooden hive of claim 1, further comprising a pair of handles attached to the exterior surface prior to application of the continuous polymeric coating.

8. The polymer reinforced wooden hive of claim 1, wherein the thickness is from 1 mm to 10 mm.

9. The polymer reinforced wooden hive of claim 8, wherein the thickness is from 2 mm to 5 mm.

10. The polymer reinforced wooden hive of claim 1, wherein the continuous polymeric coating is applied from a two-part composition.

11. The polymer reinforced wooden hive of claim 10, wherein the continuous polymeric coating further comprises an epoxy.

12. The polymer reinforced wooden hive of claim 10, wherein the continuous polymeric coating further comprises a polyurethane.

13. The polymer reinforced wooden hive of claim 10, wherein the continuous polymeric coating is a blend of the polyurea and a polyurethane.

14. The polymer reinforced wooden hive of claim 1, wherein the continuous polymeric coating is a UV curable polymeric coating.

15. The polymer reinforced wooden hive of claim 1, wherein the joints are glued and nailed prior to application of the continuous polymeric coating.

16. The polymer reinforced wooden hive of claim 1, wherein the continuous polymeric coating is applied with a stipple to provide increased friction for gripping.

17. The polymer reinforced wooden hive of claim 1, wherein the wooden box is cedar.

18. The polymer reinforced wooden hive of claim 1, wherein the wooden hive is a Langstroth hive.

19. The polymer reinforced wooden hive of claim 1, wherein the wooden hive is a top-bar hive.

20. The polymer reinforced wooden hive of claim 1, wherein the continuous polymeric coating is applied to at least one of the joints at the at least one rim.

21. The polymer reinforced wooden hive of claim 1, further comprising a wooden hive top including a lower surface, wherein at least a portion of the lower surface is coated with the continuous polymeric coating.

22. The polymer reinforced wooden hive of claim 21, wherein the at least one rim of the wooden hive box is an upper rim, and wherein only the portion of the lower surface of the wooden hive top is coated along an outer periphery so that when the wooden hive top is placed on the wooden hive box, the continuous polymeric coating is present on the wooden hive top and the wooden hive box where the outer periphery of the wooden hive top contacts the upper rim of the wooden hive box.

23. The polymer reinforced wooden hive of claim 1, further comprising a wooden hive bottom including an upper surface, wherein at least a portion of the upper surface is coated with the continuous polymeric coating.

24. The polymer reinforced wooden hive of claim 23, wherein the at least one rim of the wooden hive box is a lower rim, and wherein only the portion of the upper surface of the wooden hive bottom is coated along an outer periphery so that when the wooden hive box is placed on the wooden hive bottom, the continuous polymeric coating is present on both the wooden hive bottom and the wooden hive box where the outer periphery of the wooden hive bottom contacts the lower rim of the wooden hive box.

25. A method of reinforcing a wooden hive box, comprising:
    obtaining a wooden hive box built with joints and having an exterior surface, an interior surface, and at least one rim; and
    coating a continuous polymeric coating comprising polyurea on the exterior surface and the at least one rim, including exterior joints thereof, at a thickness sufficient to provide mechanical reinforcement to the joints and wherein the continuous polymeric coating applied to the at least one rim protects against rim damage when a hive top or a hive bottom are forced apart from the wooden hive box using a hive tool, and wherein the interior surface remains at least substantially uncoated and is a substantially uncoated wood surface.

26. The method of claim 25, further comprising the step of obtaining a wooden hive top including an upper surface, an outer rim, and a lower surface, and coating a continuous polymeric coating on at least the upper surface and the outer rim.

27. The method of claim 26, wherein the at least one rim of the wooden hive box is an upper rim, and the method further comprises the step of coating the continuous polymeric coating on only a portion of the lower surface along an outer periphery so that when the wooden hive top is placed on the wooden hive box, the continuous polymeric coating is present on the wooden hive top and the wooden hive box where the outer periphery contacts the upper rim.

28. The method of claim 25, further comprising the step of obtaining a wooden hive bottom including a lower surface, an outer rim, and an upper surface, and coating a continuous polymeric coating on at least the lower surface and the outer rim.

29. The method of claim 28, wherein the at least one rim of the wooden hive box is a lower rim, and the method further comprises the step of coating the continuous polymeric coating on only a portion of the upper surface along an outer periphery so that when the wooden hive box is placed on the wooden hive bottom, the continuous polymeric coating is present on both the wooden hive bottom and the wooden hive box where the outer periphery contacts the lower rim.

30. The method of claim 29, wherein the wooden hive bottom includes a screen for allowing air flow into the wooden hive box, and the screen is substantially uncoated from both the upper surface and the lower surface.

31. The method of claim 25, further comprising attaching a pair of handles to the exterior surface prior to application of the continuous polymeric coating.

32. The method of claim 25, wherein the thickness is from 1 mm to 10 mm.

33. The method of claim 32, wherein the thickness is from 2 mm to 5 mm.

34. The method of claim 25, wherein the step of coating includes admixing a two-part composition prior to application to the wooden hive box.

35. The method of claim 34, wherein the continuous polymeric coating further comprises an epoxy.

36. The method of claim 34, wherein the continuous polymeric coating further comprises a polyurethane.

37. The method of claim 34, wherein the continuous polymeric coating is a blend of the polyurea and a polyurethane.

38. The method of claim 34, wherein the continuous polymeric coating is a UV curable polymeric coating.

39. The method of claim 25, wherein the joints are glued and nailed prior to application of the continuous polymeric coating.

40. The method of claim 25, wherein the step of coating includes applying the continuous polymeric coating with a stipple to provide increased friction for gripping.

41. The method of claim 25, wherein the wooden box is cedar.

42. The method of claim 25, wherein the wooden hive is a Langstroth hive.

43. The method of claim 25, wherein the wooden hive is a top-bar hive.

44. A polymer reinforced wooden hive, comprising:
a wooden hive box including an exterior surface, an interior surface, an upper rim, and a lower rim,
a wooden hive top including an upper surface, an outer rim, and a lower surface;
a wooden hive bottom including a lower surface, an outer rim, and an upper surface; and
a polymer comprising polyurea applied as a continuous polymeric coating to each of:
the wooden hive box on the exterior surface, the upper rim, and the lower rim, but substantially not to the interior surface, wherein the interior surface is a substantially uncoated wood surface,
the wooden hive top on the upper surface and the outer rim, and
the wooden hive bottom on the lower surface and the outer rim.

45. The polymeric reinforced wooden hive of claim 44, wherein the continuous polymeric coating is applied at a coating thickness to provide mechanical reinforcement to all joints bridged by the continuous polymeric coating.

46. The polymeric reinforced wooden hive of claim 45, wherein the thickness is from 1 mm to 10 mm.

47. The polymeric reinforced wooden hive of claim 45, wherein the thickness is from 2 mm to 5 mm.

48. The polymeric reinforced wooden hive of claim 44, wherein the wooden hive top is also coated on the lower surface only along a periphery thereof.

49. The polymeric reinforced wooden hive of claim 44, wherein the wooden hive bottom is also coated on the upper surface only along a periphery thereof.

50. The polymer reinforced wooden hive of claim 44, wherein the wooden hive box comprise a pair of handles attached to the exterior surface prior to application of the continuous polymeric coating.

51. The polymer reinforced wooden hive of claim 44, wherein the continuous polymeric coating is applied from a two-part composition.

52. The polymer reinforced wooden hive of claim 51, wherein the continuous polymeric coating further comprises an epoxy, or a polyurethane.

53. The polymer reinforced wooden hive of claim 44, wherein the continuous polymeric coating is a UV curable polymeric coating.

54. The polymer reinforced wooden hive of claim 44, wherein the continuous polymeric coating is applied with a stipple to provide increased friction for gripping.

55. The polymer reinforced wooden hive of claim 44, wherein the wooden hive bottom comprises a screen that is substantially uncoated by the continuous polymeric coating.

56. The polymer reinforced wooden hive of claim 44, wherein the wooden box is cedar.

57. The polymer reinforced wooden hive of claim 44, wherein the wooden hive top is also coated on the lower surface.

58. The polymer reinforced wooden hive of claim 44, wherein the wooden hive bottom is also coated on the upper surface.

* * * * *